(12) United States Patent
Weseman

(10) Patent No.: US 6,179,544 B1
(45) Date of Patent: *Jan. 30, 2001

(54) UNDERRIDE PROTECTION

(75) Inventor: Brian Weseman, Grove City, MN (US)

(73) Assignee: Towmaster, Inc., Litchfield, MN (US)

( * ) Notice: Under 35 U.S.C. 154(b), the term of this patent shall be extended for 0 days.

This patent is subject to a terminal disclaimer.

(21) Appl. No.: 09/430,865

(22) Filed: Nov. 1, 1999

Related U.S. Application Data

(60) Provisional application No. 60/114,434, filed on Dec. 31, 1998.

(51) Int. Cl.⁷ ..................................................... B60P 1/00
(52) U.S. Cl. ........................... 414/480; 414/484; 414/485
(58) Field of Search ..................................... 414/477–480, 414/482–485, 537, 538, 812; 293/118

(56) References Cited

U.S. PATENT DOCUMENTS

| | | | |
|---|---|---|---|
| 2,452,681 | * 11/1948 | Rehberger | 414/484 |
| 2,919,825 | * 1/1960 | Hornsby | 414/483 X |
| 3,066,816 | * 12/1962 | Schwartz | 414/480 |
| 3,412,628 | 11/1968 | De Gain . | |
| 3,437,367 | 4/1969 | Blank . | |
| 3,495,474 | 2/1970 | Nishimura . | |
| 3,550,801 | * 12/1970 | Larson et al. | 414/480 |
| 3,887,223 | 6/1975 | Bez . | |
| 3,981,114 | 9/1976 | Chupick . | |
| 4,023,652 | 5/1977 | Torke . | |
| 4,305,694 | * 12/1981 | Chan | 414/482 |
| 4,465,312 | 8/1984 | Werner . | |
| 4,516,902 | * 5/1985 | Matson | 414/480 |
| 4,641,871 | 2/1987 | Vaughn . | |
| 4,930,823 | 6/1990 | Rivera . | |
| 5,022,703 | 6/1991 | Westbrook . | |
| 5,174,421 | 12/1992 | Rink . | |
| 5,195,764 | * 3/1993 | Schantz et al. | 414/483 X |
| 5,201,912 | 4/1993 | Terada . | |
| 5,215,426 | * 6/1993 | Bills | 414/537 |
| 5,273,330 | 12/1993 | Petry et al. . | |
| 5,403,049 | 4/1995 | Eddinghaus . | |
| 5,520,428 | 5/1996 | Bell . | |
| 5,624,143 | 4/1997 | Waldschmitt . | |
| 5,667,231 | * 9/1997 | Dierks et al. | 414/483 X |
| 5,673,952 | 10/1997 | Spease . | |
| 5,803,514 | 9/1998 | Shibuya . | |
| 5,941,852 | 8/1999 | Tan . | |
| 6,053,691 | * 4/2000 | Weseman | 414/480 |

* cited by examiner

Primary Examiner—Robert P. Olszewski
Assistant Examiner—Gerald J. O'Connor
(74) Attorney, Agent, or Firm—Patterson, Thuente, Skaar & Christensen, P.A.

(57) ABSTRACT

An improved automatic underride protection actuator for a trailer, the trailer being translatable over a ground surface, includes a rotatable ramp that is shiftable between a ground engaging load/unload disposition when the tiltable bed is in the load/unload disposition and an underride protection disposition when the tiltable bed is in the transport disposition. The ramp underride protection disposition is a disposition in which the ramp depends from a tiltable trailer bed the ramp and is rotatably displaceable from the ramp underride protection disposition by impact oft the ramp with the ground surface, such displacement substantially preventing damage.

24 Claims, 3 Drawing Sheets

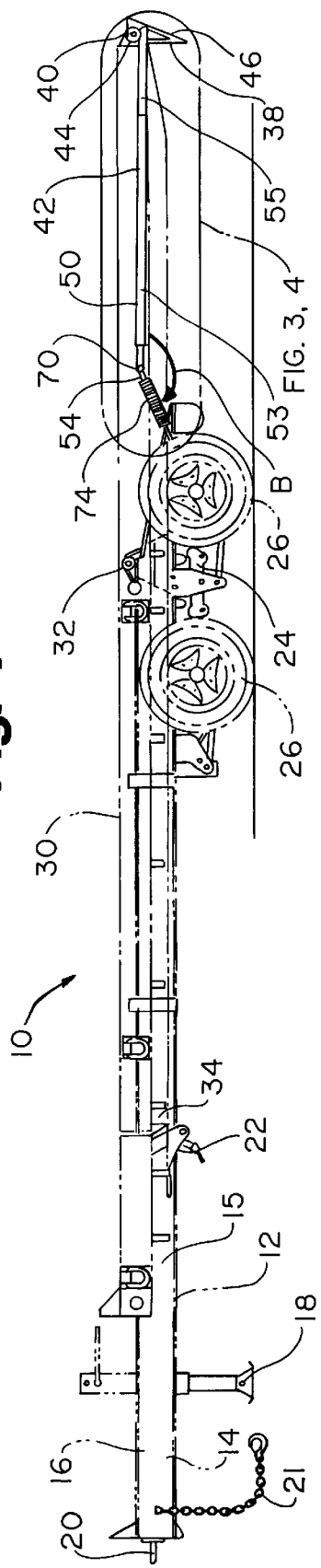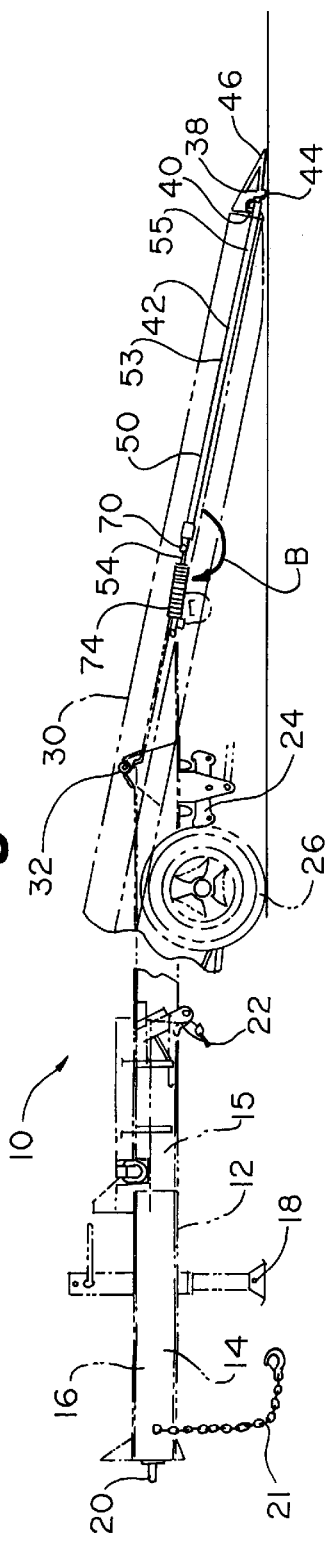

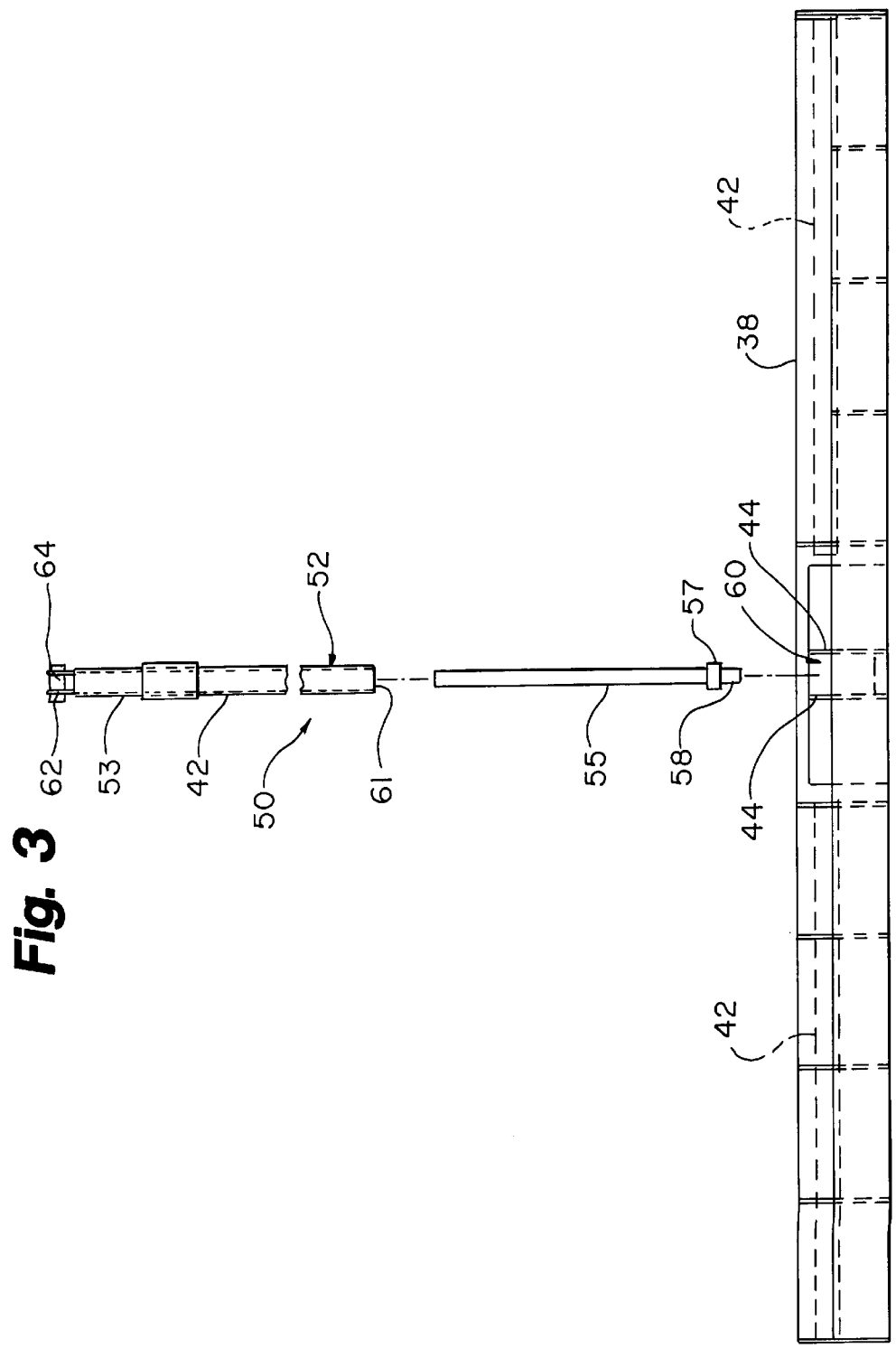

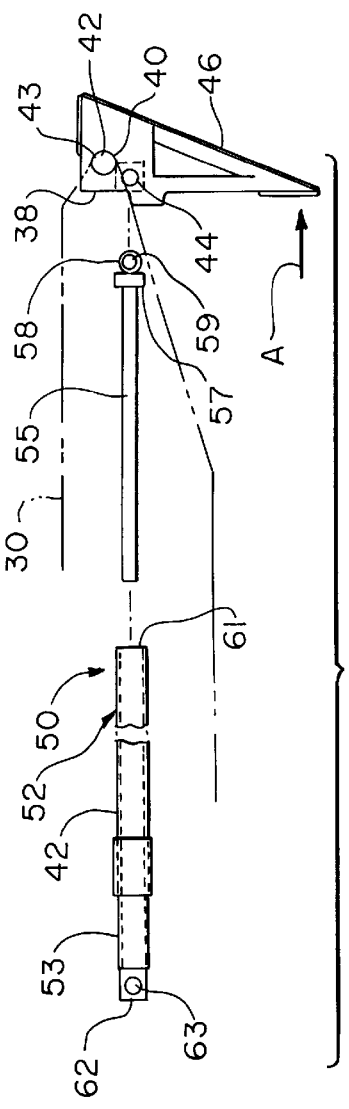
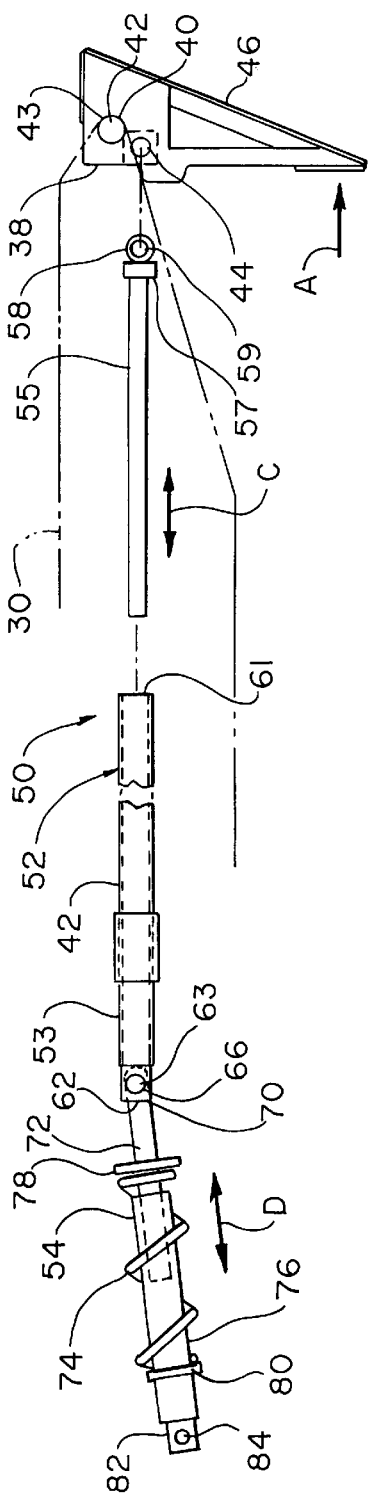

US 6,179,544 B1

UNDERRIDE PROTECTION

RELATED APPLICATIONS

This application is related to and claims the benefit of U.S. provisional application Ser. No. 60/114,434, filed Dec. 31, 1998, incorporated herein in its entirety.

TECHNICAL FIELD

The present invention relates to tilt trailers. More particularly, the present invention provides for deployable underride protection for such trailers.

BACKGROUND OF THE INVENTION

Tilt trailers are typically tiltable between a generally level bed, transport disposition for transporting a vehicle or other load disposed on the bed and a tilted load/unload disposition in which the bed is tilted with respect to a trailer frame and wherein a wheeled load, such as a vehicle, may be rolled onto or off of the bed at the rear of the trailer. There is a need in the industry for underride protection for tilt trailers when the trailers are in the transport disposition. Such underride protection disposed at the rear of the trailer is needed to prevent a vehicle that collides with the rear of the tilt trailer from underriding the trailer. In such a collision without underride protection, the colliding vehicle may slide under the trailer bed and the rear of the trailer bed may then impact the passenger compartment of the colliding vehicle, thereby causing injury to the occupants of the colliding vehicle. With underride protection, the front of the impacting vehicle remains in the proximity of the rear of the trailer, sparing the occupants from injury caused by intrusion of the rear of the trailer into the passenger compartment.

Underride protection in non-tiltable, fixed-bed trailers has long been provided, typically by a frame made of angle iron that depends from the rear of the bed of the trailer. Such protection is commonly seen on semi-type trailers. Such underride protection in non-tiltable trailers is typically permanently fixed in place.

A difficulty for tilt trailers is that any underride protection provided in the transport disposition must be withdrawn in some manner in order to provide for the tilting of the trailer bed in the load/unload disposition where the rear of the bed is in close proximity to the surface of the ground underlying the trailer. A fixed underride protection frame, such as provided on the aforementioned non-tiltable trailers, would prevent such tilting by coming into contact with the ground surface. Accordingly, there is a need of the industry for an underride protection for tilt trailers that is automatically deployed to provide underride protection when the trailer is in the transport disposition and is automatically retracted to permit tilting of the trailer bed as the trailer bed transitions from the transport disposition to the load/unload disposition.

Tilt trailers are typically lower to the ground in the transport disposition than semi-type trailers. This leads to a further difficulty for tilt trailers in that a depending underride protection (ramp) may drag on the ground surface over which the vehicle is passing, especially in rough or uneven areas. This puts an unwanted strain on the underride protector and may, in fact, seriously damage the underride protection. There is a need of the industry for an underride protector that is substantially insulated from such damage.

SUMMARY OF THE INVENTION

The present invention substantially meets the aforementioned needs of the industry. The present invention utilizes a ramp that is pivotally coupled to the rear of the trailer bed to depend downward from the rear of the trailer bed when the trailer is in the transport disposition. In such disposition, the ramp functions as the underride protection. The ramp would be contacted by a vehicle colliding with the rear of the tiltable trailer and prevent the colliding vehicle from underriding the trailer. The ramp is preferably held in its depending disposition by the force of gravity and is disposed substantially transverse to the plane of the trailer bed. The ramp is restrained from rotating frontward and upward (thereby providing the desired underride protection), but is free to rotate upward and rearward toward the load/unload disposition. During forward motion of the vehicle when the ramp drags on an obstruction in the surface over which the vehicle is passing, the impact causes such upward and rearward rotation of the ramp, thereby preventing damage to the underride protector (ramp). After passing the obstruction, the force of gravity quickly returns the ramp to the depending disposition where the ramp is again braced to bear the force of a rear impact.

When the trailer is in transition from the transport disposition to the load/unload disposition, the ramp is automatically rotated upward and rearward and extended rearward from the rear of the trailer to function as a ramp. In the load/unload disposition, the rearward extended ramp provides transitional support for vehicles being loaded onto (or unloaded from) the trailer bed and the ground surface on which the trailer is resting.

The present invention is an improved automatic underride mechanism for a trailer, the trailer being translatable over a ground surface, the automatic underride mechanism includes a rotatable ramp being automatically shiftable between a ground engaging load/unload disposition when the tiltable bed is in the load/unload disposition and an underride protection disposition when the tiltable bed is in the transport disposition, the underride protection disposition being a disposition in which the ramp depends from a tiltable trailer bed, the ramp being rotatably disposable from the ramp underride protection disposition by rearward impact of the ramp with the ground surface, such displacement substantially preventing damage to the ramp by such impact.

DETAILED DESCRIPTION OF THE DRAWINGS

FIG. 1 is a side elevational view of a tilt trailer with the tiltable bed depicted in phantom in the underride protection disposition, the trailer being in the transport disposition;

FIG. 2 is a side elevational view of a sectioned portion of the tilt trailer with the tiltable bed depicted in phantom, the trailer being in the load/unload disposition;

FIG. 3 is an enlarged top plan view of the rear portion of the automatic underride mechanism as depicted in FIG. 1, with portions thereof exploded;

FIG. 4 is an enlarged side elevational view of the rear portion of the automatic underride mechanism as depicted in FIG. 1, with portions thereof exploded; and FIG. 5 is an enlarged side elevational view of the automatic underride mechanisms depicted in FIG. 1, with portions thereof exploded.

DETAILED DESCRIPTION OF THE DRAWINGS

A tilt trailer is shown generally at 10 in the figures. The tilt trailer 10 has major subcomponents comprising chassis 12 and tilt bed 30.

Referring to FIGS. 1 and 2, the chassis 12 of the tilt trailer 10 has a frame 14 that is preferably comprised of spaced apart welded steel beams. The outer two beams 15 that comprise frame 14 are bent inward at the front of the tilt trailer 10 to comprise the tongue 16 of the trailer 10.

The tongue 16 has a pair of jacks 18 that may be cranked up and down as desired to support the front portion of the tilt trailer 10. A tow ring 20 and safety chains 21 are provide at the front of the tongue 16 for coupling to a towing vehicle. A rotatable lock down 22 is fixedly coupled to the outwardly directed side portion of each of the frame rails 15 that comprise the tongue 16.

A wheel suspension system 24 depends from the underside of the frame 14 and carries a plurality of ground engaging wheels 26. The suspension system 24 may include a braking system (not shown) that acts on the wheels 26.

The tilt bed 30 is disposed on top of and supported by the frame 14. Tilt bed 30 is coupled to frame 14 by a pivot 32. A pair of lock down catches 34 are positioned at the front of the tilt bed 30. The lock down catches 34 may be engaged by the respective lock downs 22 to releasably secure the tilt bed 30 to the frame 14 in the transport disposition depicted in FIG. 1. Disengaging the lock downs 22 from their associated lock down catches 34 frees the tilt bed 30 to rotate about the pivot 32 and to transition from the transport disposition depicted in FIG. 1 to the load/unload disposition depicted in FIG. 2.

The automatic underride mechanism (AUM) of the present invention is shown generally at 50 in the figures. AUM 50 includes a pivotable ramp 38 and an AUM actuator mechanism 52. The pivotable ramp 38 is disposed at the rear of the tilt bed 30 extending substantially the full width of the tilt bed 30. The ramp 38 has a series of pivot bores 40 defined therein. See FIGS. 3 and 4. The pivot bores 40 are in registry. A pair of bar hinges 42 are passed through the pivot bores 40 and through corresponding bores 43 defined in the rear portion of the tilt bed 30 to pivotally couple the ramp 38 to the rear potion of the tilt bed 30.

An actuator bar coupler 44 is comprised of a pair of bores that are in registry defined in the ramp 38. The actuator bar coupler 44 is displaced from the pivot bore 40 by a distance that is less than 6 inches and preferably approximately 3½ inches. See FIG. 4.

A load surface 46 is presented on the ramp 38. When the tilt bed 30 is in the load/unload disposition depicted in FIG. 2, the load surface 46 is generally upwardly directed in order to receive vehicles being loaded onto the tilt bed 30. The load surface 46 is presented in a generally rearward direction when the ramp 38 is in the downward depending ramp underride protection disposition depicted in FIGS. 1, 3, and 4. It is the load surface 46 of the ramp 38 that bears the impact of a rear colliding vehicle and prevents the colliding vehicle from underriding the tilt bed 30.

The AUM actuator mechanism 51 of the present invention is preferably a multi-link system coupled to the ramp 38. Actuator mechanism 51 preferably has two subcomponents: actuator bar 52 and tension bar 54, both which comprise a link of the multi-link system actuator mechanism 51 that is coupled to the ramp 38.

Referring to FIGS. 3–5, the first link of the actuator mechanism 51 is the actuator bar 52. The actuator bar 52 is preferably comprised of tube 53 and rod 55. The tube 53 is preferably formed of one and one-half inch schedule 80 steel pipe. A lateral bushing 58 is welded to a first end of the rod 55. The bushing 58 has a bore 59 defined longitudinally therethrough. In order to couple the actuator bar 52 to the ramp 38, the lateral bushing 58 is positioned between two actuator bar couplers 44 of the ramp 38. A pin 60 is then disposed in the bore 59 and through the actuator bar couplers 44, thereby pivotally coupling the rod 55 of the actuator bar 52 to the ramp 38. The actuator bar 52 has two degrees of motional freedom. The entire actuator bar 52 is free to translate with respect to the bed 30, as indicated by arrow C, and the rod 55 is free to translate within tube 53.

As indicated above, the rod 55 is preferably free to translate within the bore defined in the tube 53. A collar 57 is fixedly coupled to the rod 55, as by welding. The collar 57 abuts the first end 61 of the tube 53 when the ramp 38 is in the depending, underride protecting disposition, as depicted in FIGS. 1 and 4. This abutting relationship prevents the ramp 38 from rotating forward and upward under the tilt bed 30 during a rear impact. The actuator bar 52, comprised of tube 53 and rod 55, restrains the ramp 38 and bears the force of the impact on the ramp 38 during a rear impact collision.

Since the rod 55 is free to translate within the bore defined in the tube 53, the ramp is free to rotate rearward and upward out of the depending, underride protecting disposition, depicted in FIGS. 1 and 4, responsive to a force acting rearward on the ramp 38. Such force is indicated by arrow A in FIG. 4. The ramp 38 is held in its depending disposition by the force of gravity. The ramp 38 is free to rotate upward toward the load/unload disposition (see FIG. 2) when the ramp 38 drags on an obstruction in the surface over which the vehicle is passing, thereby preventing damage to the underride protector mechanism 50. The obstruction exerts a force on the ramp 38 similar to that depicted by arrow A. Such rotation draws the rod 55 rearward out of the bore defined in the tube 53. After passing the obstruction, the force of gravity acting on the ramp 38 will quickly return the ramp 38 to the depending disposition where the ramp 38 is braced to bear the force of a rear impact by the collar 57 abutting the first end 61 of the tube 53.

A clevis 62 is disposed at a second end of the tube 53 of the actuator bar 52. A pair of bores 63 that are in registry are defined in the clevis 62. A clevis pin 64 is passed through the bores 63 and through a bore 66 defined in a tension bar connector to pivotally couple the actuator bar 52 to the tension bar 54.

The tension bar 54 has a rod 72 that is free to translate within a bore defined in the tube 76, as indicated by arrow D. A coil spring 74 is disposed concentric with the rod 72 and tube 76. The spring 74 is restrained between a collar 78 on the rod 72 and a collar 80 on the tube 76. The spring 74 exerts a bias on the rod 72 tending to urge the rod 72 and the actuator bar 52 rearward.

A connector 82 is disposed at the distal end of the tube 76. The converter 82 may have a bore 84 defined therein. A pin (not shown) may be inserted in the bore 84 to rotationally couple the tube 76 to the frame 14.

In operation, to cause the bed 30 to tilt from the transport disposition to the load/unload disposition, the two lock downs 22 are disengaged from the respective lock down catches 34, thereby freeing the tilt bed 30 to tilt with respect to the chassis 12. The weight of the tilt bed 30 forward of the pivot 32 biases the bed 30 in the transport disposition. With an unloaded tilt trailer 10, a person standing on the deck of the tilt bed 30 forward of the pivot 32 may move rearward to a position on the tilt bed 30 that is rearward of the pivot 32 in order to commence the transition to the load/unload disposition.

In the transport disposition, the spring 74 is in its most compressed condition. The rod 72 is in its fowardmost disposition and the actuator bar 52 is in its forwardmost disposition. The weight of the operator rearward of the pivot 32 causes the tilt bed 30 to start tilting from the transport disposition depicted in FIG. 1 to the load/unload disposition depicted in FIG. 2 and, in cooperation with the bias exerted by the spring 74, acts to start the rearward and upward rotation of the ramp 38. The action of a hydraulic piston (not shown) may act as a restraint on the tilting motion of the tilt bed 30 causing the tilt bed 30 to move relatively slowly toward the load/unload disposition. The tilting motion of the tilt bed 30 results in an increased included angle B defined between the actuator bar 52 and the tension bar 54. The angle B ranges from approximately 125 degrees in FIG. 2 to substantially 180 degrees in FIG. 3. The spring 74 acts on the rod 72 to extend the rod 72 from the tube 76. The generally rearward motion of the rod 72 acts on the actuator bar 52 to shift the actuator bar 52 rearward, thereby assisting in rotating the pivotable ramp 38 rearward in an arc of approximately 90 degrees about the pivot bore 40. The bias of the spring 74 is helpful in overcoming the mass of the ramp 38.

In order to cause the tilt bed 30 to transition from the load/unload disposition to the transport disposition, the actions are essentially the reverse of the aforementioned actions. An operator, standing on the deck of the tilt bed 40 and positioned rearward of the pivot 32 walks forward on the tilt bed 30 to a position forward of the pivot 32. The added weight of the operator forward of the pivot 32 causes the tilt bed 30 to commence transition to the transport disposition. The tilting motion may be restrained by a hydraulic piston (not shown). The ramp 38 is a substantially massive device, designed to bear the weight of heavy vehicles transitioning on and off the bed 30. The unrestrained weight of the ramp 38 under the influence of the force of gravity causes the ramp 38 to rotate downward to the disposition of FIGS. 4 and 5.

The tilting motion of the tilt bed 30 causes the included angle B between the actuator bar 52 and the tension bar 54 to decrease. As the angle decreases the weight of the ramp 38 acts to shift the actuator bar 52 forward. The forward shift of the actuator bar 52 acts to shift the rod 72 generally forward into the tube 76. This action compresses the spring 74 and preloads the spring 74 to be ready to exert its bias on the ramp 38 the next time that the bed 30 is tilted to the load/unload disposition. The pivotable ramp 38 rotates downward about the pivot bore 40 to the underride protection disposition as depict din FIGS. 2, 4 and 5. When the tilt bed 30 is again disposed lying on the frame 14 of the chassis 12 in the transport disposition, the lock downs 22 may be re-engaged with the lock down catches 34 in order to secure the tilt bed 30 to the chassis 12. As described, the ramp 38 is automatically retracted to the underride protection disposition when the tilt bed 30 transitions to the transport disposition so that at all times that the tilt bed 30 is in the transport disposition, the ramp 38 is depending therefrom, without direct operator intervention, in position to prevent the underriding motion of an impacting vehicle.

The present invention may be embodied in other specific forms without departing from the spirit of the essential attributes thereof. Therefore, the illustrated embodiment should be considered in all respects as illustrative and not restrictive, reference being made to the appended claims rather than to the foregoing description to indicate the scope of the invention.

What is claimed is:

1. An underride protector for a transport vehicle, the transport vehicle having a tiltable, shiftable bed operably shiftably coupled to a vehicle frame, comprising:

a barrier being automatically deployable into a downward depending disposition with respect to the tiltable bed when the tiltable bed is in a transport disposition wherein the barrier is free to rotate rearward relative to the transport vehicle when the barrier is disposed in the downward depending disposition responsive to a force exerted thereon.

2. The underride protector of claim 1 wherein the barrier is shiftable between the downward depending disposition and a retracted disposition.

3. The underride protector of claim 2 wherein the barrier is automatically shifted to the retracted disposition when the tiltable bed is shifted from the transport disposition to a load/unload disposition.

4. The underride protector of claim 1 wherein the barrier is a ramp.

5. The underride protector of claim 4 wherein the ramp extends substantially between a tiltable bed rear margin and a ground surface when the tiltable bed is shifted to a load/unload disposition.

6. The underride protector of claim 1 further including an actuating mechanism operably coupled to the vehicle frame and to the barrier, the actuating mechanism being actuated by a tilting motion of the tiltable bed to effect deployment of the barrier.

7. The underride protector of claim 6 wherein the actuating mechanism is biased to exert a bias on the barrier tending to shift the barrier out of the downward depending disposition.

8. The underride protector of claim 7 wherein the actuating mechanism acts to restrain the barrier from forward rotation relative to the transport vehicle from the downward depending disposition.

9. The underride protector of claim 6 wherein the actuating mechanism includes at least a first link and a second link pivotally coupled to the first link.

10. The underride protector of claim 9 wherein the first link is extendable and the second link is extendable.

11. The underride protector of claim 10 wherein at least one of the first link and the second link is biased to an extended disposition.

12. The underride protector of claim 11 wherein the bias is exerted by a spring.

13. The underride protector of claim 9 wherein the first link includes a tube and a rod, the rod being shiftably disposed in the tube bore.

14. The underride protector of claim 13 further including a stop disposed on the rod, the stop bearing on a proximal end of the tube, thereby limiting the shifting translation of the rod with respect to the tube.

15. The underride protector of claim 9 wherein the actuating mechanism is shiftable relative to the tiltable bed.

16. The underride protector of claim 6 wherein the barrier is hingedly coupled to the tiltable bed about a pivot axis and the actuating mechanism is pivotally coupled to the barrier at a pivot point, the pivot point being displaced from the pivot axis.

17. The underride protector of claim 1 wherein the barrier spans substantially a full width dimension of the tiltable bed.

18. An automatic underride mechanism for a trailer, the trailer being translatable over a ground surface, the trailer having a forward end and an opposed rearward end and having a tiltable bed supported by a trailer frame, the tiltable bed being tiltable with respect to the trailer frame between a transport disposition and a load/unload disposition the tiltable bed presenting a trailer rear margin, a rotatable ramp being operably coupled to the tiltable bed proximate the trailer rear margin, the automatic underride mechanism comprising:

a rotatable ramp being shiftable between a ground engaging load/unload disposition when the tiltable bed is in the load/unload disposition and an underride protection disposition when the tiltable bed is in the transport disposition, the ramp underride protection disposition being a disposition in which the ramp depends from the tiltable bed, the ramp being rotatably displaceable rearward from the ramp underride protection disposition by impact of the ramp with the ground surface, such displacement substantially preventing damage to the ramp.

19. A method of providing underride protection for a transport vehicle having a tiltable bed shiftable between a transport disposition and a load/unload disposition, comprising the steps of:

shifting a barrier device from a retracted disposition to downward directed, underride-preventive disposition, the shifting being effected by the tilting shift of the tiltable bed; and freeing the barrier to rotate rearward relative to the transport vehicle when the barrier is disposed in the downward depending disposition responsive to a force exerted thereon.

20. The method of claim 19 including the step of the barrier providing a ramp function extending between a bed rear margin and a ground surface when the barrier is in the retracted disposition.

21. The method of claims 20 including the step of freely rotating the barrier rearward responsive to a force applied thereto when the barrier is in the underride-preventive disposition.

22. The method of claim 19 including the step of biasing the barrier in the retracted disposition.

23. The method of claim 22 including the step of deploying the barrier from the retracted disposition to the underride-protection disposition substantially by the force of gravity.

24. The method of claim 23 including the step of extending the barrier substantially coextensive with a width dimension of the tiltable bed.

* * * * *